United States Patent

[11] 3,621,987

| [72] | Inventor | Robert E. Sherwood |
| | | Cincinnati, Ohio |
| [21] | Appl. No. | 853,397 |
| [22] | Filed | Aug. 27, 1969 |
| [45] | Patented | Nov. 23, 1971 |
| [73] | Assignee | W. R. Grace & Co. |
| | | Cambridge, Mass. |
| [32] | Priority | Sept. 5, 1968 |
| [33] | | Germany |
| [31] | | P 17 81 188.0 |

[54] SYSTEM FOR GUIDING THE TRAVEL OF A BELT SUPPORTED BY A ROTARY DRUM
17 Claims, 4 Drawing Figs.

[52] U.S. Cl. ..................................................... 198/202, 226/21
[51] Int. Cl. ..................................................... B65g 15/62
[50] Field of Search .......................................... 198/202, 184; 226/21, 22, 23; 74/241

[56] References Cited
UNITED STATES PATENTS

| 1,186,906 | 6/1916 | Hopkins ..................... | 74/241 X |
| 3,312,335 | 4/1967 | Paris et al. ................. | 198/202 |
| 3,489,264 | 1/1970 | Begiebing ................... | 198/202 |

FOREIGN PATENTS

| 1,035,046 | 7/1958 | Germany ..................... | 198/202 |

Primary Examiner—Richard E. Aegerter
Assistant Examiner—Douglas D. Watts
Attorneys—C. E. Parker, Metro Kalimon, William L. Baker, Theodore C. Browne and Armand McMillan ABSTRACT: A guidance system for a belt running over a roller or drum in which misalignment of the belt causes a signal which tilts the axis of a supporting drum in a direction to correct the belt alignment. Means are provided for interrupting the signal whereby the drum axis returns to its rest position before reactuation by the signal whereby realignment of the belt is produced by a repetitive pulsation like tilting of the drum axis increasing the tension at one edge of the belt.

Inventor
ROBERT E SHERWOOD

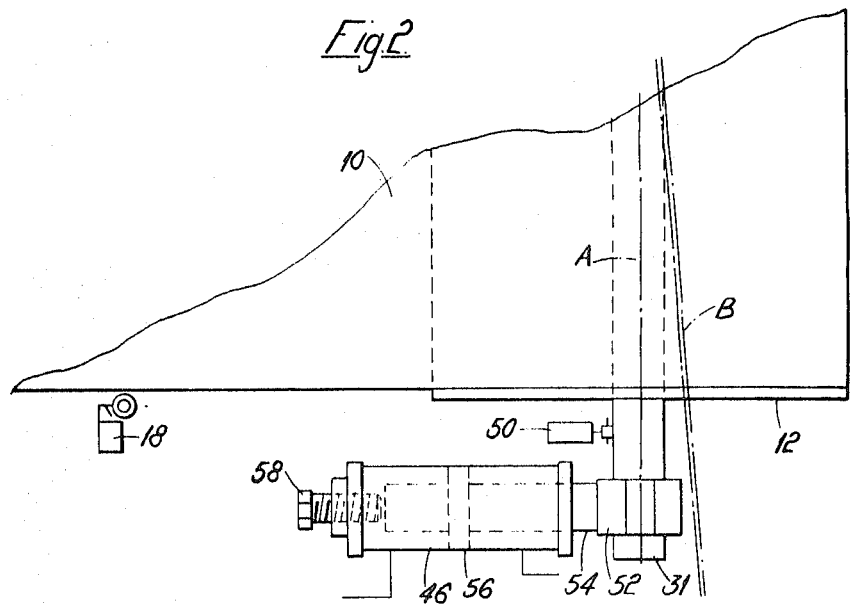
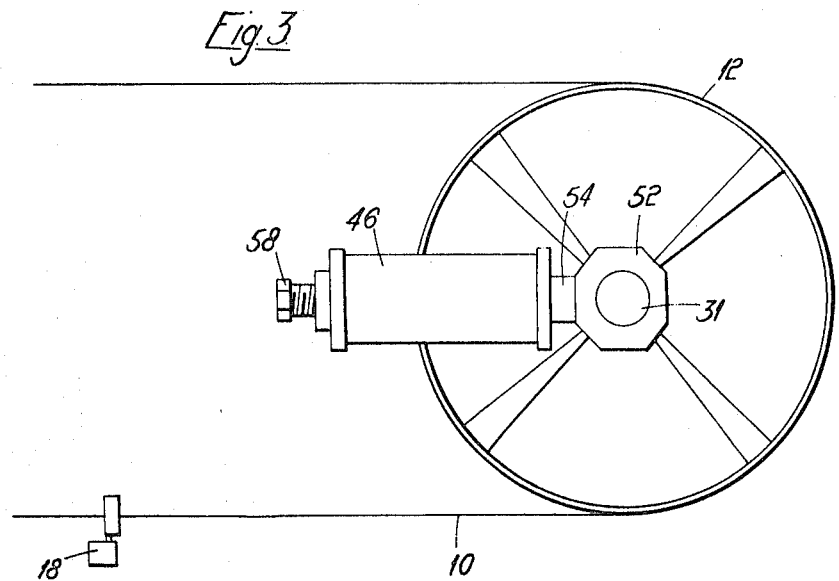

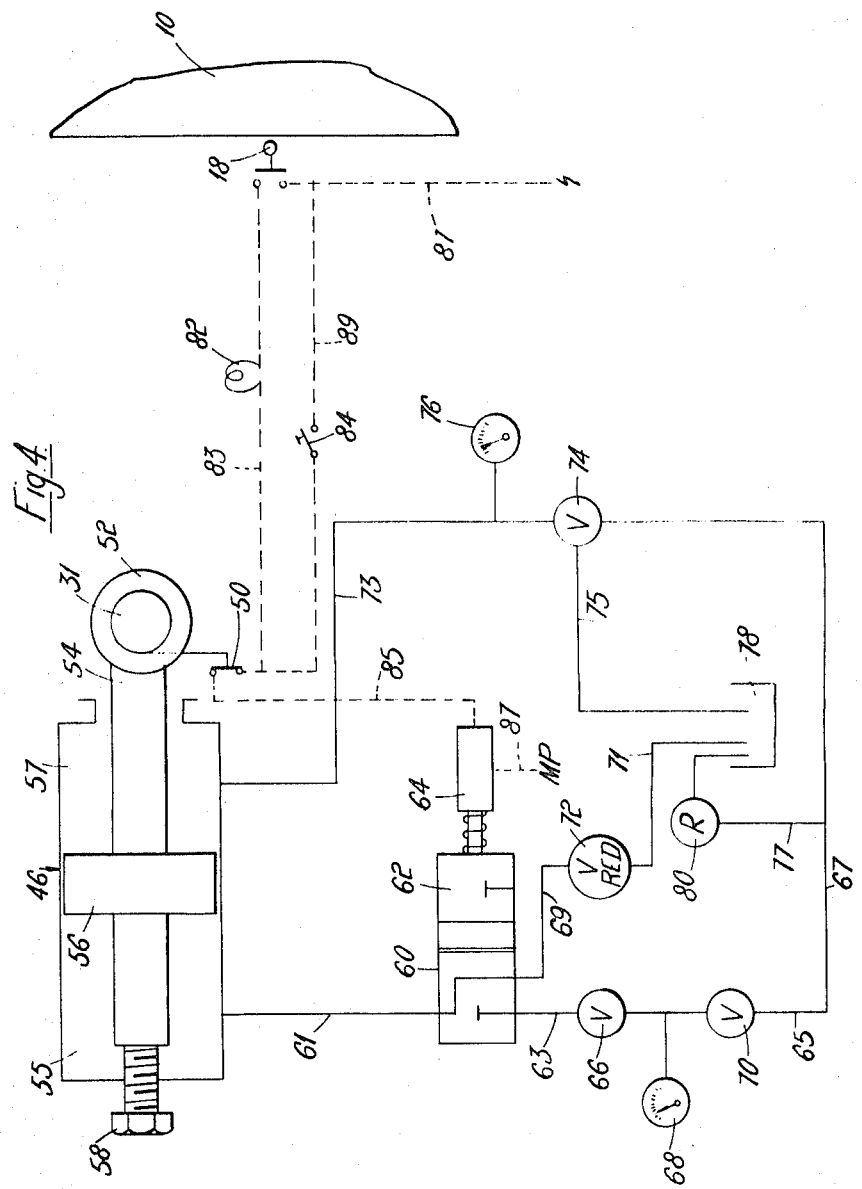

SYSTEM FOR GUIDING THE TRAVEL OF A BELT SUPPORTED BY A ROTARY DRUM

This invention relates to a system for guiding belts, especially endless belts, running over drums. The system is especially useful for the accurate lateral guidance of steel belts.

Endless belts which run over several drums or rolls have, due to irregularities in the belts themselves or because of a not fully accurate suspension of the various drums, the tendency to run off laterally to one side of the guiding and driving drums. In this respect, belts of different materials behave in a quite different manner: while rubber belts wander in general towards the side of greater tension, steel belts withdraw from the side of greater tension and move in the opposite direction. The lateral guidance of endless belts is the more difficult the shorter their length, i.e. the smaller the distance between the axes of the two drums at which the direction of motion of the endless belt is reversed. While the lateral guidance of longer conveyor belts is relatively simple, the difficulties are substantially increased with shorter belts with a distance between the axes of the reversing drums of less than about 8 meters. In general, two methods are known today for the lateral guidance of endless belts. The first method utilizes track strips of rubber or similar material which are vulcanized to the inner side of the belts near the edge or also in the middle thereof. These track strips are guided in suitable track wheels which may be either free-running wheels or also the actual guiding or driving drums provided with a suitable annular groove for the track strips. While the track wheels or drums are fixed in axial direction, the further guiding and reversing drums must have a certain play in axial direction so that they may follow lateral movements of the belt. However, with this method only a relatively inaccurate lateral guidance is achieved. Although it is sufficient to ensure in the case of long conveyor belts, that the endless belt does not run completely off the drums, it does not guarantee an accurate guidance of the belt over a long running time.

For a more accurate guidance of endless belts, in practice electromechanical guidance systems are often used, these systems displacing or tilting the axis of one of the guiding or driving drums thereby creating a tension gradient between the two side edges of the endless belt. Dependent on the characteristics of the belt material, the belt withdraws from the increased tension or wanders towards the increased tension to return to its midposition. Such a guidance system is actuated by a suitable switch which is positioned at the edge of the rotating belt and is energized when the belt runs off to one side. The displacement of the axis is normally greater than necessary so that the belt is shifted beyond the midposition towards the other side actuating the switch provided at that side. This again causes a correction so that the belt is shifted several times over the center line until it has reached the desired position. Under optimum conditions and with shorter belts the lateral deviations occurring with this system still amount to at least ±5 mm. The same is true for a system provided with track strips and suitable track wheels or drums.

For many purposes, an accuracy of the lateral guidance of ±5 to 10 mm. only is insufficient. In addition, this accuracy is achieved only under optimum operating conditions in total, while the above-mentioned additional difficulties occur when the belt length decreases or when a belt runs not only over two drums but over further guiding and tension drums. Such a system with three, four or more drums has a very unstable "running equilibrium" so that each minor correction causes a strong lateral swinging of the belt. Such a special device is described below which requires a very great accuracy of the belt guidance since in this device the endless belt does not only run over a plurality of driving and guiding drums but must in addition synchronously carry another endless belt by means of the friction existing between the two belts without relative shiftings occurring between the adjoining belt surfaces. It is therefore the object of the present invention to develop a guiding method for belts, especially endless belts, which guarantees a maximum of accuracy and running stability even under difficult conditions.

Accordingly, one aspect of the present invention provides a method of guiding a belt running over a drum comprising providing on either side of the belt one or more signal devices responding to deviations of the belt from its central rest position, actuating with the signal a mechanism to tilt the axis of the drum in a direction to cause restoration of the belt to its rest position, interrupting the signal after a predetermined movement of the mechanism to cause the mechanism to return to its rest position, and continuing this pulsating tilting of the axis until the belt is in its normal rest position when no signal is provided by the signal device. Preferably, the drum axis is tilted outwardly in the direction of the convex curvature of the belt in order to increase the belt tension at one edge of the belt.

In general, steel belts and in particular endless steel belts cannot be produced with accurately linear running edges and with an exactly perpendicular splice so that in practice each belt has a specific natural running centerline which usually does not fully coincide with the physical centerline of the belt. An accurately operating guiding system must therefore be constructed in such a way that the belt runs without distortion or stretching on the natural centerline and is not forced into an unnatural constrained position. The natural centerline can be found by running the belt on the machine to be used and merely adjusting the axes of the various guiding and driving drums of the system in such a way that the belt runs quietly. As soon as the belt runs on its natural centerline, the guidance system can be put into operation to prevent displacement of the belt from its natural midposition by means of relatively small corrections without overcorrections.

The essence of the method of the invention is that the normal position of the axis of the guiding drum is not permanently altered which would lead to an unnatural shifting of the normal midposition of the running belt, but that the pressure on the belt is only pulsatingly unilaterally increased by minor tiltings of the axis from its normal position whereby the belt is returned to its normal midposition. When during operation constantly unilateral corrections are required, this indicates that the position of the axis of the guiding drum must be altered somewhat in order to force the belt into the new slightly shifted natural midposition. Preferably, the corrections are carried out by two devices for tilting the drum axis which act upon both sides of the guiding drum axis. This way a uniform correction can be achieved, though it is also possible to use only one device at one side of the drum axis. It is particularly favorable when the interrupter for advancing the drum axis is attached directly to the drum axis, adjusting the contact travel of the interrupter in accordance with the desired degree of tilting.

It has been found especially favorable to use a hydraulic cylinder as the device for tilting the drum axis; in this case the pulse duration and frequency of the single tiltings can be controlled by valves which are inserted into the cycle of the hydraulic liquid before and/or behind the hydraulic cylinder.

The invention also provides a guidance system for a belt running over drums comprising adjusting means for tilting the axis of a belt-supporting drum, a signal device for engagement by a belt when the belt wanders from its required path of travel, said adjusting means being operable in response to a signal from the signal device, and an interrupter for interrupting the signal from the signal device to cause the adjusting means to return the axis to its rest position, said interrupter being operable upon a predetermined advance of said adjusting means. The adjusting means for tilting the drum axis is preferably a hydraulic cylinder with a hydraulic control system, the cylinder being preferably actuated via an electromagnetic valve. The signal device may be an electric limit switch which is open in rest condition. The interrupter is preferably a quick-break switch positioned at the axis of the drum, the contact travel of said switch being selectively variable for adjustment of the desired tilting of the drum axis.

For readjusting the normal position of the drum axis and therewith of the natural centerline of the belt, the means for tilting the drum axis can be provided either with an adjusting screw or with an automatic control means. When using a hydraulic system with hydraulic cylinders for advancing the drum axis, the automatic control means can be an additional hydraulic reservoir in parallel connection with the main hydraulic cylinder which alters by oil superpressure the zero position of the cylinder in the necessary direction in case the cylinder is permanently actuated.

For a supervision of the control system it is advantageous to provide an indicator such as a signal light in the electric control circuit which indicates excitation of the guidance system. In addition, the electric control circuit may be provided with a manually operable switch which allows a manual actuation of the adjusting means. In this respect, the guidance system is especially advantageous since the interrupter also when actuated by hand automatically prevents that the drum axis is permanently shifted from its normal position, i.e. the interrupter allows only a pulsating advance of the axis returning it each time subsequently to its normal position.

The invention will be further described by way of illustration with reference to the accompanying drawings, in which:

FIG. 2 is a fragmentary top view to a larger scale of a control device at one side of the belt and a supporting drum;

FIG. 3 is a side view of the control device shown in FIG. 2;

FIG. 4 is a basic circuit diagram for the belt guidance system.

Figure 1:
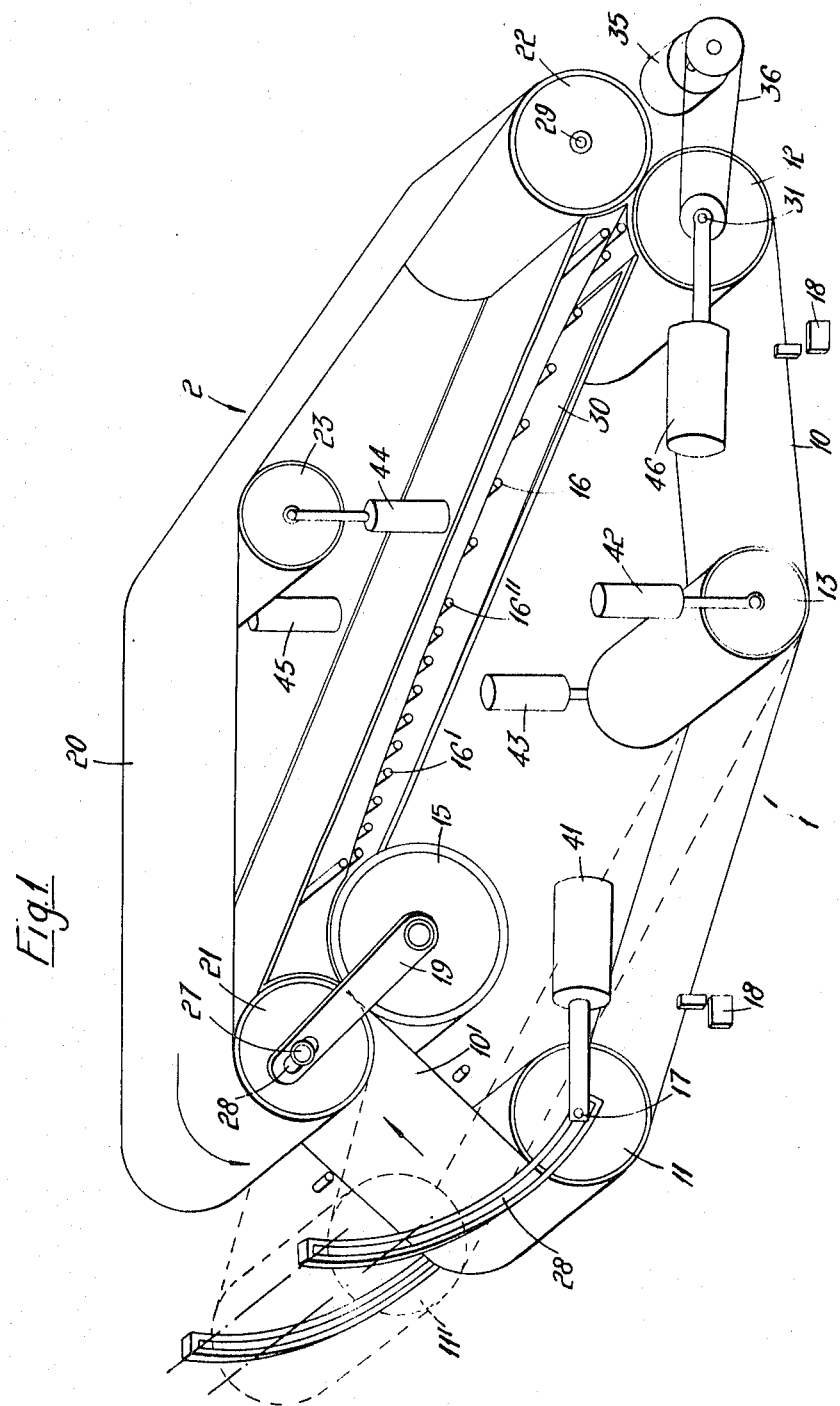
FIG. 1 is a perspective view of a machine embodying the belt guidance system of the invention.

FIG. 1 shows a device for preparing sheets from a curable composition which requires an especially accurate guidance of an endless belt made from steel or a similar material. The frame structure supporting the device has been omitted in the drawing in order to allow its functioning to be more easily understood. The device consists of a lower part 1 and an associated upper part 2. A lower endless belt 10 runs in the direction of the arrow over two tension drums 11 and 12. In the embodiment shown in FIG. 1, the upper run of the lower belt 10 runs further in an upwardly or outwardly directed curve over another guiding drum 15 which is carried in such a way that it can be displaced in a vertical direction. The upper run of the belt 10 runs further in an outwardly bent curve over rotatably carried guiding rolls 16, 16', 16'' in order to achieve a uniform distribution of the pressure exerted by the lower run of an upper belt 20 on the lower belt 10 and to avoid warping of the belt as far as possible.

In addition, the device is provided with a compensating drum 13 for the lower belt 10. The compensating drum 13 is positioned within the belt 10 and pressed against the lower run of the belt. Force is exerted on the axis of the drum 13 by two hydraulic cylinders 42, 43 pressing the drum against the running belt 10. A further hydraulic-compensating means 41 is provided for the drum 11 and a hydraulic means 46 is provided for the driving drum 12 driven by a motor 35.

An extreme accuracy of the guidance of the belt 10 is not only required because of the various drums and rolls present in the device but also because the upper belt 20 is carried along by the lower belt 10 and runs without any separate driving means over the drums 21, 22 and 23. In order to prevent a detrimental relative motion between the adjacent runs of the belts 10 and 20, it must be ensured that the lower belt 10 has substantially no lateral movement. This can be accomplished by the method of the invention for guiding endless belts. Signal means 18, which are preferably provided on both sides of the lower belt 10, are energized when the belt runs off its natural midposition resulting in an actuation of the hydraulic means 46 provided at one or both ends of the axis 31 of the drum 12.

The details of the guidance and control system are shown in FIG. 4. The axis 31 of the drum 12 is carried in bearings 52 which are engaged by the piston rod 54 of the hydraulic cylinder motor 46. When the belt 10 runs off to one side, the switch 18 associated to that side is actuated and a circuit is closed via line 81, 83 and 85 to ground whereby the magnetic valve 64 is energized. By this operation, the hydraulic valve condition 60 is replaced by the valve condition 62 in the hydraulic two/three-way valve and an oil supply to the working chamber 55 of the hydraulic cylinder 46 is opened via the line 61 so that the hydraulic piston 56 is shifted to the right, the hydraulic pressure being supplied from a hydraulic liquid reservoir 78 by a pump 80 via the line 77, 67, 65, 63. The advancing speed of the hydraulic cylinder is dependent on the adjustment of the pressure reducing valve 70 and the volume control valve 66; the pressure between these valves being indicated by a pressure gauge 68.

The axis 31 is connected with a quick-break switch 50 which is opened after a predetermined advance of the axis 31 in dependence on the adjusted contact travel so that the magnetic valve 64 is deenergized and the two/three-way valve returns to its position shown in the drawing. Now the hydraulic pressure liquid is fed into the chamber 57 of the hydraulic cylinder 46 via the line 75 and 73 with the interposed pressure reducing valve 74, the pressure downstream of the pressure-reducing valve being indicated by a control pressure gauge 76, and the piston 56 is returned into its rest position, the liquid flowing from the chamber 55 via line 61, 69, the backflow throttle valve 72, and line 71 into the hydraulic reservoir 78.

The electric control circuit is provided with a signal light 82 which signals when the control circuit is active by indicating that the switch 18 is closed. When the light indicates that the guidance system is constantly energized at one side of the belt, it is advisable to alter the normal position of the axis 31 of the cylinder at that side to a small extent which can be effected, for example, by use of an adjusting screw 58 on the cylinder 46 to limit retraction of the piston 56. By this readjustment of the position of the axis 31 also the normal position of the belt 10 is slightly altered and adapted to the existing conditions. It is possible to select a very small contact travel of the switch 18 so that the switch is closed by minute lateral deviations of the belt, e.g. by a deviation of about 1 mm., to cause a correction. Also the amount of advance of the axis 31 can be limited to a narrow range by selection of a suitably short contact travel for the interrupter switch 50 and may amount to only a few millimeters. The advance speed and the return speed of the hydraulic cylinder 46 depend in the illustrated embodiment substantially on the adjustment of the volume control valve 66 and the backflow throttle valve 72, respectively. This way, the pulse duration and pulse frequency can be substantially varied and selected according to the existing conditions. A manually operable switch 84 is provided in a line 89 in parallel with the switch 18 and light 82 in line 83 for permitting manual actuation of the mechanism independently of the switch 18.

FIGS. 2 and 3 show an embodiment of the control device. As stated above, it is preferred to use a corresponding control device also at the other side of the drum axis 31 in connection with corresponding signal switches and interrupter switches.

The axis 31 for the drum 12 is carried by a bearing 52 which is connected with the piston rod 54 of the hydraulic motor 46. In addition, the hydraulic motor cylinder 46 is provided with the mechanical adjusting screw 58 for varying the normal position of the axis 31. As soon as the belt 10 runs against the signal switch 18, this signal switch is closed and causes, via a suitable magnetic valve and hydraulic circuit, actuation of the hydraulic motor 46 whereby the drum axis 31 is shifted from its normal position A to the tilted position B (drawn in an exaggerated way). By the displacement of the axis 31, the interrupter switch 50 is opened so that the hydraulic cylinder is returned into the zero position determined by the adjusting screw 58. This operation is pulsatingly repeated until the belt 10 has returned to the desired midposition and the signal switch 18 is no longer closed. The contact travel of the switch 50 may be selectively variable for permitting adjustment of the travel of the motor 46 and axis 31 allowed before interruption of the signal from the switch 18. It may be stressed that the correction of the position of the drum axis can also be effected by other means, e.g. by a fully electric actuation with suitable electromotors. Moreover, it is apparent that the invention—though described substantially with respect to the guidance of endless belts—can also be used for guiding belts in general.

I claim:
1. A guidance system for a belt running over drums comprising adjusting means connected to a belt-supporting drum for tilting the drum, a signal device for engagement by a belt when the belt wanders from its required path of travel, said adjusting means being advanced from its rest position in response to a signal from the signal device, and an interrupter for interrupting the signal from the signal device to cause the adjusting means to return the drum to its rest position, said interrupter being operable upon a predetermined advance of said adjusting means.

2. A guidance system according to claim 1, comprising separate signal devices provided on opposite sides of the path of travel for the belt.

3. A guidance system according to claim 1, wherein separate adjusting means are provided at opposite ends of said drum axis.

4. A guidance system according to claim 1, wherein the adjusting means comprises a hydraulic piston and cylinder motor and a hydraulic control system including an electromagnetic valve operable in response to said signal.

5. A guidance system according to claim 1, wherein the signal device is an electrical limit switch which is open in rest condition.

6. A guidance system according to claim 1, wherein the interrupter is a switch positioned near the axis of the drum for actuation upon tilting of the drum axis.

7. A guidance system according to claim 6, including means for selectively varying the contact travel of the quick-break switch.

8. A guidance system according to claim 1, wherein the adjusting means is provided with an adjusting screw for setting the rest position of the axis.

9. A guidance system according to claim 1, wherein the adjusting means is provided with an automatic control for readjusting the rest position of the axis.

10. A guidance system according to claim 1, wherein an indicator means is provided responsive to the signal for indicating actuation of the adjusting mechanism.

11. A guidance system according to claim 1, including a manually operable switch bypassing the signal device for manual actuation of the adjusting means.

12. A method of guiding a belt running over a drum comprising providing on either side of the belt one or more signal devices responding to deviations of the belt from its central rest position, actuating with the signal a mechanism to tilt the axis of the drum in a direction to cause restoration of the belt to its rest position, interrupting the signal after a predetermined movement of the mechanism to cause the mechanism and axis to return to its rest position, and continuing this pulsating tilting of the axis until the belt is in its normal rest position where no signal is provided by the signal device.

13. A method according to claim 12, wherein the axis of the drum is tilted in a direction radially outwardly from the center of curvature of the belt passing thereover to increase the belt tension at one side of the belt.

14. A method according to claim 12, wherein separate mechanisms and control signal devices are provided for opposite sides of the belt.

15. A method according to claim 12, wherein the drum axis is tilted through a permanent amount of change the rest position of the belt when the signal device constantly responds at one side only of the belt.

16. A method according to claim 12, wherein the desired degree of tilting is adjusted by selecting a desired degree of contact travel of an interrupter switch to interrupt the signal.

17. A method according to claim 12, wherein the drum-axis tilting mechanism is hydraulically operated, the duration and frequency of tilting movement being controlled by valves in the hydraulic control circuitry.

* * * * *